United States Patent Office 3,829,418
Patented Aug. 13, 1974

3,829,418
BASIC BENZIMIDAZOLINE ARYLHYDRAZONE DYESTUFFS
Roderich Raue, Leverkusen, and Hans-Lothar Dorsch, Cologne, Germany, assignors to Bayer Aktiengesellschaft, Leverkusen, Germany
No Drawing. Filed Mar. 16, 1971, Ser. No. 124,975
Claims priority, application Germany, Mar. 23, 1970, P 20 13 791.1
Int. Cl. C09b 23/16; D06p 3/34, 3/70
U.S. Cl. 260—240 G          12 Claims

ABSTRACT OF THE DISCLOSURE

Basic hydrazone dyestuffs of the formula

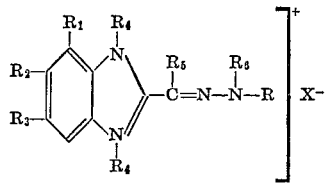

wherein R is an aromatic-carbocyclic radical, $R_1$ is hydrogen or alkyl, $R_2$ is hydrogen, alkyl, alkoxy, or an amino which may be substituted by alkyl, sulphonyl, or carbamoyl, $R_3$ is hydrogen, alkyl, or alkoxy, $R_4$ is alkyl, $R_5$ is nitrile, or carbonamido, $R_6$ is hydrogen, alkyl, aralkyl, or cycloalkyl, $X^-$ is an anion, and wherein the aliphatic, cycloaliphatic, or aromatic radicals R, $R_1$, $R_2$, $R_3$, $R_4$, $R_5$, or $R_6$ may be further substituted by non-ionic substituents having a Hammett constant $\sigma$ para less than 0.7. These dyestuffs are useful in dyeing or printing leather, cotton, cellulose acetate, and lignin-containing fibers.

---

The invention relates to new basic hydrazone dyestuffs of general formula

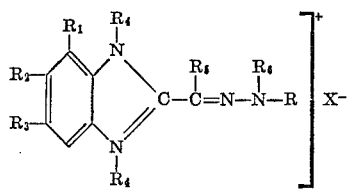

wherein

R represents an aromatic-carbocyclic radical,
$R_1$ represents hydrogen or an alkyl radical,
$R_2$ represents hydrogen, an alkyl or alkoxy group, or an amino group which is optionally substituted by alkyl groups or by an acyl, sulphonyl or carbamoyl radical,
$R_3$ represents hydrogen or an alkyl or alkoxy radical,
$R_4$ represents an alkyl radical,
$R_5$ represents the nitrile group or an optionally substituted carbonamide group, and
$R_6$ represents hydrogen or an alkyl, aralkyl or cycloalkyl group, and
$X^-$ represents the radical of an anion,
and wherein the aliphatic, cycloaliphatic and aromatic radicals R, $R_1$, $R_2$, $R_3$, $R_4$, $R_5$ and $R_6$ are unsubstituted or substituted by non-ionic substituents having a Hammett constant $\sigma$ para less than 0.7, processes for their manufacture and their use for dyeing and printing.

(On the subject of Hammett constants $\sigma$ para, see H. A. Staab, Einführung in die theoretische organische Chemie (Introduction to Theoretical Organic Chemistry), 1959, Weinheim, especially page 584.) Possible non-ionic substituents of this nature are for example: lower alkyl and alkoxy radicals with 1–4 carbon atoms, such as methyl, ethyl, n-propyl, iso-propyl, n-butyl, iso-butyl, methoxy, ethoxy, n-propoxy, iso-propoxy, n-butoxy and iso-butoxy, aralkyl, such as benzyl, aralkoxy, such as benzyloxy, aryl, such as phenyl, and phenyl radicals substituted by non-ionic radicals, for example chlorophenyl or methylphenyl, aryloxy groups, such as phenoxy, halogen substituents, especially Cl and Br, carboxylic acid ester groups, optionally N-substituted carbonamide groups wherein lower alkyl groups with 1–4 carbon atoms are preferred as substituents, optionally substituted amino groups, acyloxy groups, such as acetoxy, acylamino groups, such as acetylamino and methylsulphonylamino, and acyl radicals, such as the acetyl radical.

A group of preferred dyestuffs corresponds to the formula

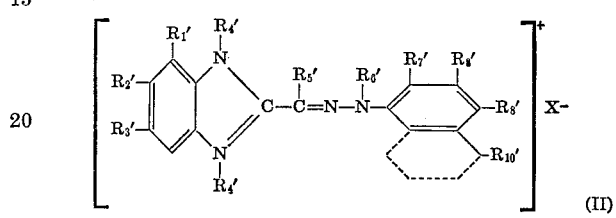

wherein $R_1'$ represents hydrogen or methyl,
$R_2'$ represents hydrogen, methyl, methoxy, ethoxy, acetylamino, benzoylamino or ureido,
$R_3'$ represents hydrogen or methyl,
$R_4'$ represents methyl or ethyl,
$R_5'$ represents nitrile, carbonamido or N-methylcarbonamido,
$R_6'$ represents hydrogen, methyl, ethyl or n-butyl,
$R_7'$ represents hydrogen, methyl, methoxy, ethoxy or phenoxy,
$R_8'$ represents hydrogen, methyl, methoxy, ethoxy or benzyl,
$R_9'$ represents hydrogen, chlorine, methyl, methoxy, ethoxy, phenoxy, acetylamino, benzoylamino, N,N-diethylsulphonylamino, cyclohexyl, benzyl, benzyloxy, phenylazo optionally substituted by methyl and methoxy, or 6-methylbenzthiazolyl-2-,
$R_{10}'$ represents hydrogen, methyl, methoxy, chlorine, or a tetramethylene bridge to form with the phenyl ring a 5, 6, 7, 8-tetrahydronaphthyl radical, and
$X^-$ represents an anion.

A further group of particularly valuable dyestuffs corresponds to the general formula

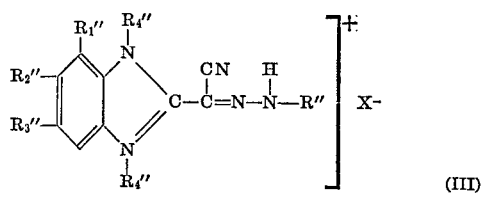

wherein

R" denotes a benzene radical,
$R_1''$ denotes hydrogen or an alkyl radical with 1–4 carbon atoms,
$R_2''$ and $R_3''$ denote hydrogen, or an alkyl or alkoxy radical with 1–4 carbon atoms and
$R_4''$ denotes an alkyl radical with 1–4 carbon atoms and
$X^-$ denotes an anion,
and wherein R" can carry substituents with a Hammett constant $\sigma$ para of less than 0.3.

The new dyestuffs of general formula I, in which $R_6$ represents hydrogen, are obtained if amines of formula $$H_2N—R$$

wherein R represents an aromatic-carbocyclic radical, are diazotised and coupled to compounds of general formula

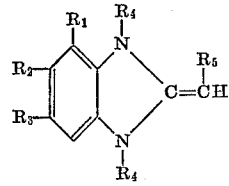

(IV)

wherein $R_1$ represents hydrogen or an alkyl radical,
$R_2$ represents hydrogen, an alkyl or alkoxy group, or an amino group which is optionally substituted by alkyl groups or by an acyl, sulphonyl or carbamoyl radical,
$R_3$ represents hydrogen or an alkyl or alkoxy radical,
$R_4$ represents an alkyl radical,
$R_5$ represents the nitrile group or an optionally substituted carbonamide group,
and wherein the aliphatic, cycloaliphatic and aromatic radicals R, $R_1$, $R_2$, $R_3$, $R_4$ and $R_5$ are unsubstituted or substituted by non-ionic substituents with a Hammett constane σ para of less than 0.7.

A further process for the manufacture of the dyestuffs of the general formula I, in which $R_6$ denotes hydrogen, consists of coupling aromatic-carbocyclic amino compounds of formula $$H_2N\text{---}R$$

wherein R represents an aromatic-carbocyclic radical, to compounds of general formula

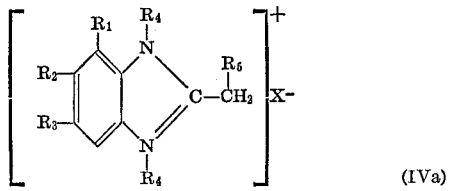

(IVa)

wherein $R_1$ represents hydrogen or an alkyl radical,
$R_2$ represents hydrogen, an alkyl or alkoxy group, or an amino group which is optionally substituted by alkyl groups or by an acyl, sulphonyl or carbamoyl radical,
$R_3$ represents hydrogen or an alkyl or alkoxy radical,
$R_4$ represents an alkyl radical,
$R_5$ represents the nitrile group or an optionally substituted carbonamide group, and
$X^-$ represents the radical of an anion,
and wherein the aliphatic, cycloaliphatic and aromatic radicals R, $R_1$, $R_2$, $R_3$, $R_4$ and $R_5$ are unsubstituted or substituted by non-ionic substituents with a Hammett constant σ para of less than 0.7.

Dyestuffs of general formula I, in which $R_6$ denotes alkyl, cycloalkyl or aralkyl, are obtained if, for example, basic dyestuffs obtainable according to one of the processes described above are converted, in a manner which is in itself known, with the aid of acid-binding agents into the azo base of formula

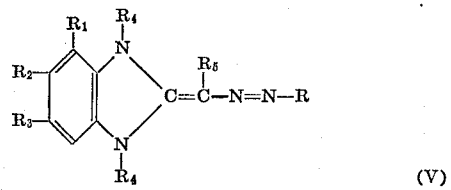

(V)

wherein R, $R_1$, $R_2$, $R_3$, $R_4$ and $R_5$ have the above-mentioned meaning, and these are converted into the ammonium compound by means of a quaternising agent, in the presence or absence of a solvent or diluent, and where appropriate at elevated temperature.

The following aromatic amines $H_2N\text{---}R$ are for example suitable for use as the starting material for the manufacture of the dyestuffs according to the invention:

aminobenzene,
4-chlor-1-aminobenzene,
2-, 3- or 4-methyl-1-aminobenzene,
2-, 3- or 4-methoxy-1-aminobenzene,
2-, 3- or 4-ethoxy-1-aminobenzene,
1-amino-2, 4-dimethylbenzene,
1-amino-2,5-dimethylbenzene,
1-amino-3,4-dimethylbenzene,
1-amino-2,4-dimethoxybenzene,
1-amino-2,5-dimethoxybenzene,
2-aminodiphenyl-ether,
4-aminodiphenyl-ether,
1-amino-4-acetylaminobenzene,
1-amino-4-benzoylaminobenzene,
1-amino-2-methoxy-5-chlorobenzene,
1-amino-2-methoxy-4-sulphonic acid diethylamidobenzene,
1-amino-4-cyclohexylbenzene,
1-amino-4-benzylbenzene,
1-amino-3-benzylbenzene,
1-amino-4-benzyloxybenzene,
2-(4'-amino-phenyl)-6-methylbenzthiazole,
4-amino-azobenzene,
4-amino-4'-methoxyazobenzene,
4-amino-4'-methylazobenzene, and
5,6,7,8-tetrahydro-1-naphthylamine.

Suitable coupling components IV are especially the following compounds:

1,3-dimethyl-2-cyanomethylenebenzimidazoline,
1,3,5-trimethyl-2-cyanomethylenebenzimidazoline,
1,3,4,5,6-pentamethyl-2-cyanomethylenebenzimidazoline,
1,3-dimethyl-5-methoxy-2-cyanomethylenebenzimidazoline,
1,3-dimethyl-5-ethoxy-2-cyanomethylenebenzimidazoline,
1,3-dimethyl-5-acetylamino-2-cyanomethylenebenzimidazoline,
1,3-dimethyl-5-benzoylamino-2-cyanomethylenebenzimidazoline,
1,3-dimethyl-5-ureido-2-cyanomethylenebenzimidazoline,
1,3-diethyl-2-cyanomethylenebenzimidazoline,
1,3-diethyl-5-methyl-2-cyanomethylenebenzimidazoline,
1,3-diethyl-5-ethoxy-2-cyanomethylenebenzimidazoline,
1,3-dimethylbenzimidazolinylidene-2-acetic acid amide, and
1,3-dimethylbenzimidazolinylidene-2-acetic acid methylamide.

The coupling components are manufactured in a known manner by alkylation of 2-cyanomethylbenzimidazole or of 2-carbonamidomethylbenzimidazole and its substitution products in an aqueous or organic medium, with the addition of an acid-binding agent. The 5-amino-1,3-dimethyl-2-cyanomethylenebenzimidazoline derivatives are obtained by nitration of 1,3-dialkyl-2-cyanomethylenebenzimidazoline and subsequent reduction or catalytic hydrogenation; the further reaction of the amino compound with acylating agents to give compounds on which formula (IV) is based is effected in the customary manner.

The coupling is carried out in the customary manner by adding the diazonium salt solution to the solution of the benzimidazoline compound in hydrochloric acid at 0-10°, and adding acid-binding agents such as sodium acetate.

Possible quaternising agents are, amongst others, dimethyl sulphate, diethyl sulphate, methyl iodide, 4-toluenesulphonic acid methyl ester, 4-toluenesulphonic acid ethyl ester and 4-toluenesulphonic acid butyl ester.

Suitable solvents and diluents are, for example, acetone, ligroin, benzine, benzene, chlorobenzene, toluene, xylene and chloroform.

The anionic radicals $X^-$ can be either inorganic or organic ions; as examples, there may be mentioned: $Cl^-$, $Br^-$, $I^-$, $CH_3SO_4^-$, $C_2H_5SO_4^-$, p-toluenesulphonate, $$HSO_4^-$$

benzenesulphonate, p-chlorobenzenesulphonate, phosphate, acetate, formate, propionate, oxalate, lactate, maleate, crotonate, tartrate, citrate, $NO_3^-$, perchlorate and $ZnCl_3^-$. The nature of the anionic radicals is immaterial as regards the properties of the dyestuffs, provided the radicals are substantially colourless radicals which do not undesirably impair the solubility of the dyestuffs.

The products according to the invention are valuable dyestuffs which can be used for dyeing and printing materials of leather, mordanted cotton and cellulose acetate, and for dyeing lignin-containing fibres such as coir, jute and sisal. They are furthermore suitable for the manufacture of writing fluids, rubber-stamp inks and ball pen pastes, and can also be used in flexographic printing.

Suitable materials for dyeing and printing with the basic dyestuffs of the above general formula are especially flocks, fibers, filaments, strips, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanethylene, a part of the dyestuffs being distinguished by high speed of absorption; the dyestuffs are also suitable for dyeing flocks, fibres, filaments, strips, woven fabrics or knitted fabrics of acid-modified aromatic polyesters, and for dyeing acid-modified polyamide fibres. Acid-modified aromatic polyesters are, for example, polycondensation products of sulphoterephthalic acid and ethylene glycol, that is to say polyethylene glycol terephthalates containing sulphonic acid groups (Type Dacron 64 of E. I. du Pont de Nemours and Company), such as are described in Belgian Patent Specification 549,179 and U.S.A. Patent Specification 2,893,816.

Dyeing can be carried out from a weakly acid liquor, in which case the goods are appropriately introduced into the dyebath at 40–60° C. and then dyed at the boil. It is also possible to dye under pressure at temperatures above 100° C. Further, the dyestuffs can be added to spinning solutions for the manufacture of fibres containing polyacrylonitrile or be applied to the unstretched fibre.

The dyeings on polyacrylonitrile-containing material which are obtainable according to the invention are distinguished by very good fastness to light, wet processing, rubbing and sublimation. With anionic precipitants, such as alumina, tannin, or phosphotungstic or phosphomolybdic acids, the dyestuffs form light-fast pigments which can advantageously be employed in paper printing.

The dyestuffs can be employed either individually or as mixtures. Mixtures in many cases show a higher colour strength when dyeing polyacrylonitrile materials.

Compared with the coupling products of diazotised aromatic amines to 1,3,3-trimethyl-2-methyleneindoline (Berichte der Deutschen Chemischen Gesellschaft, 57 (1924), page 144 and thereafter), the dyeings of the dyestuffs according to the invention on polyacrylonitrile are distinguished by significantly improved fastness to light.

EXAMPLE 1

10.7 parts of 1-amino-4-methylbenzene are dissolved in 150 parts by volume of 6% strength aqueous hydrochloric acid, then cooled to 0–5° C., and diazotised with 7.3 parts of sodium nitrite in 20 parts of water. After stirring for about a further 30 minutes, the excess nitrous acid is destroyed by means of amidosulphonic acid and the diazo solution is run through a filter into a clear solution, cooled to 10° C., of 18.5 parts of 1,3 - dimethyl - 2 - cyanomethylene-benzimidazoline in 150 parts by volume of 5% strength aqueous hydrochloric acid, whilst stirring. After stirring for a further 30 minutes, the mixture is buffered with 300 parts by volume of 20% strength aqueous sodium acetate solution and the yellow precipitate which thereby separates out is stirred for some hours longer at room temperature. After filtering off, and washing on the filter with 500 parts by volume of 5% strength aqueous sodium chloride solution, a yellow coupling product is obtained. 10 parts of this moist product are boiled up with 500 parts by volume of water and treated with 30 parts by volume of 10% strength aqueous hydrochloric acid whilst hot, whereby a clear yellow solution is produced. After filtering and cooling, the dyestuff of formula

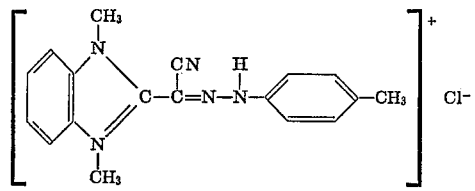

which is thus produced is salted out with 32 parts of sodium chloride; after filtering off, washing with dilute aqueous sodium chloride solution and drying, 6.2 parts are obtained, and the material melts at between 210 and 212° C., with decomposition. This dyestuff dyes polyacrylonitrile, its copolymers with vinyl compounds, and acid-modified polyesters and polyamides in a clear greenish-tinged yellow colour shade. The dyeings are especially distinguished by outstanding fastness to light.

Further valuable dyestuffs, listed below, are obtained in accordance with this procedure on starting from the appropriate starting components:

| Dyestuff | Colour shade on polyacrylonitrile |
|---|---|
| 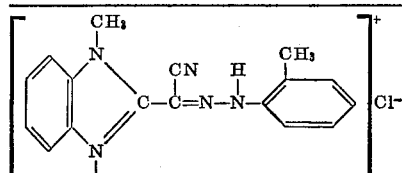 | Greenish-tinged. yellow. |
| 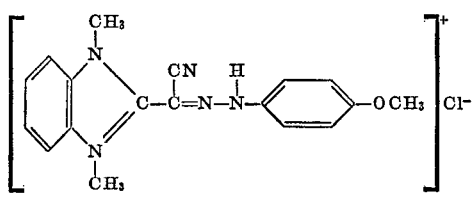 | Yellow. |

TABLE—Continued
| Dyestuff | Colour shade on polyacrylonitrile |
|---|---|
| 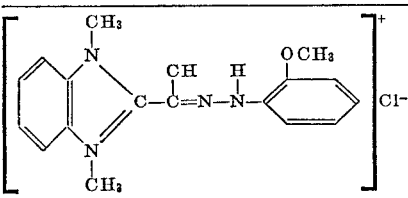 | Yellow. |
| 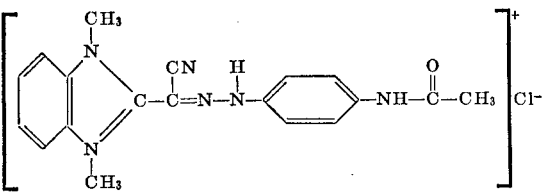 | Reddish-tinged yellow. |
| 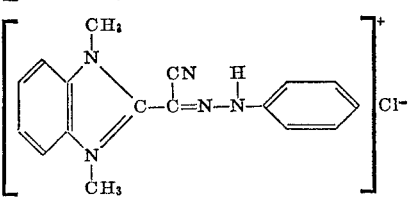 | Greenish-tinged yellow. |
| 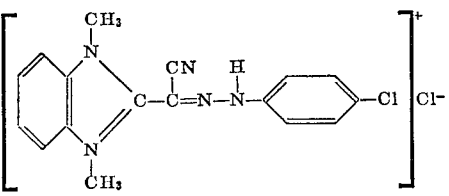 | Do. |
| 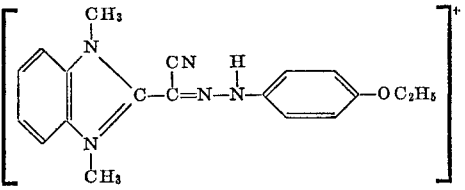 | Reddish-tinged yellow. |
| 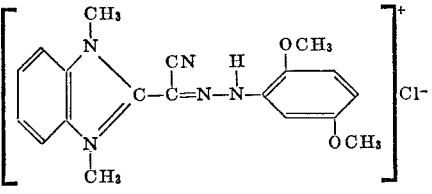 | Yellowish-tinged orange. |
| 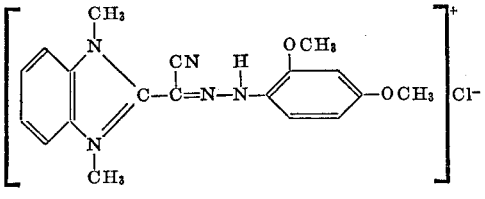 | Reddish-tinged yellow. |
| 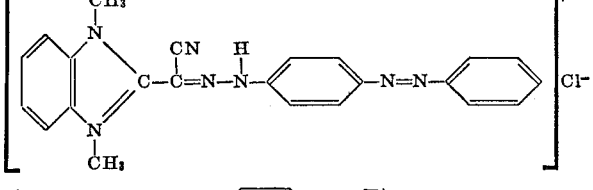 | Do. |
| 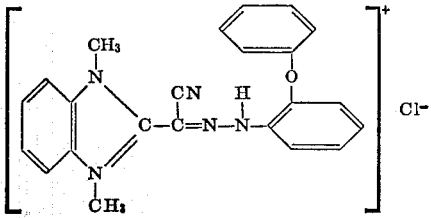 | Greenish-tinged yellow. |

TABLE—Continued
| Dyestuff | Colour shade on polyacrylonitrile |
|---|---|
| 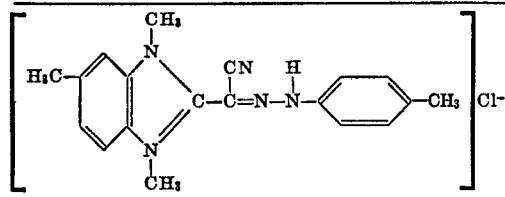 | Greenish-tinged yellow. |
| 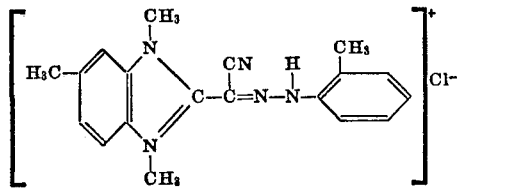 | Yellow. |
| 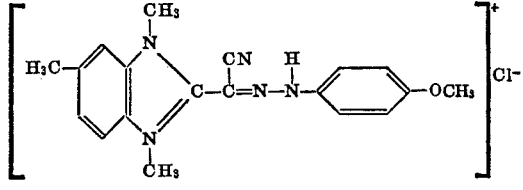 | Do. |
| 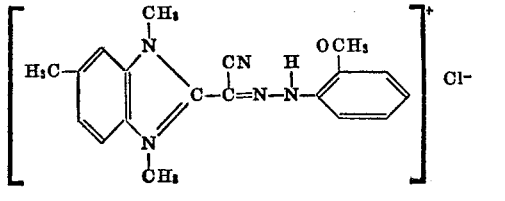 | Greenish-tinged yellow. |
| 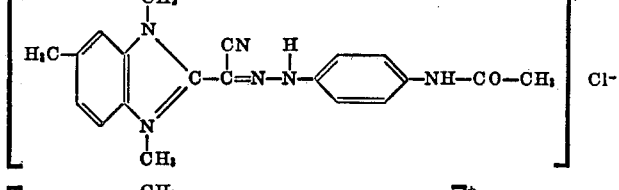 | Reddish-tinged yellow. |
| 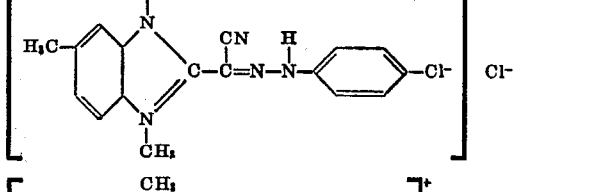 | Yellow. |
| 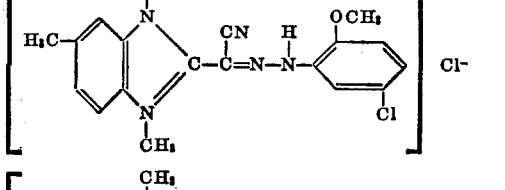 | Greenish-tinged yellow. |
| 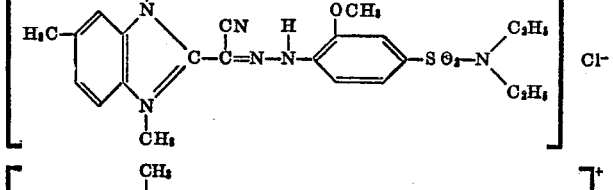 | Do. |
| 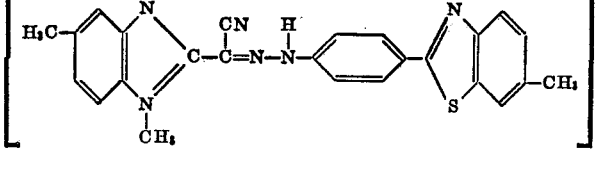 | Reddish-tinged yellow. |

TABLE—Continued
| Dyestuff | Colour shade on polyacrylonitrile |
|---|---|
| 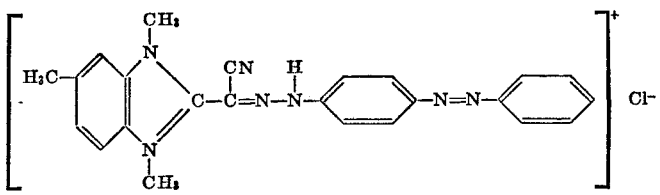 | Reddish-tinged yellow. |
| 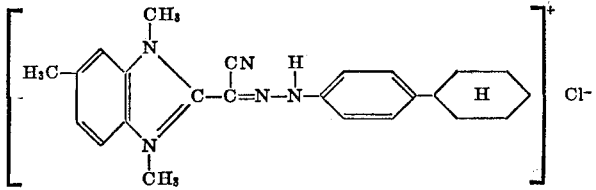 | Yellow. |
| 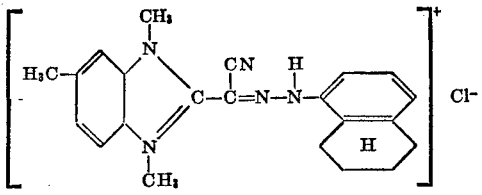 | Do. |
| 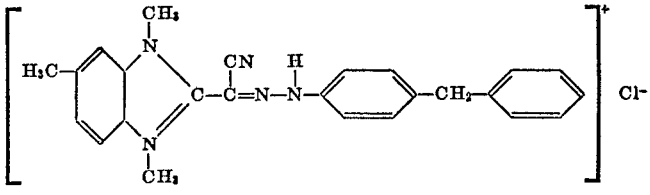 | Greenish-tinged yellow. |
| 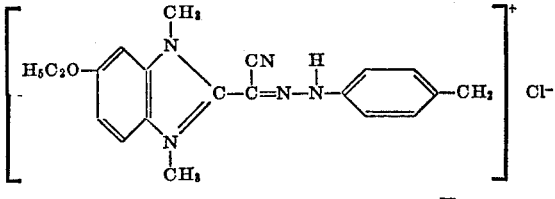 | Do. |
| 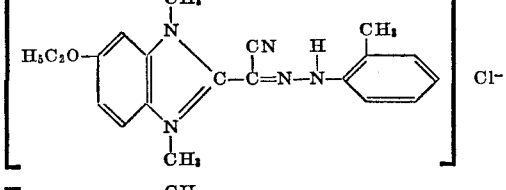 | Yellow. |
| 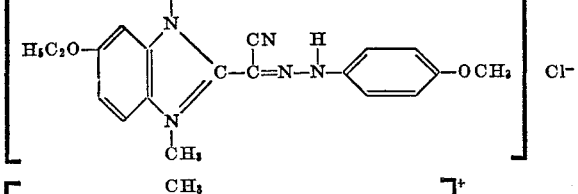 | Do. |
| 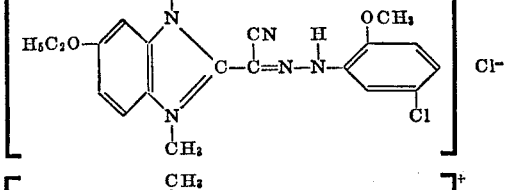 | Do. |
| 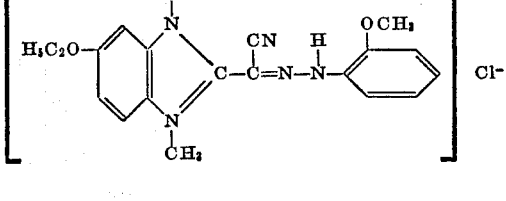 | Do. |

| Dyestuff | Colour shade on polyacrylonitrile |
|---|---|
| 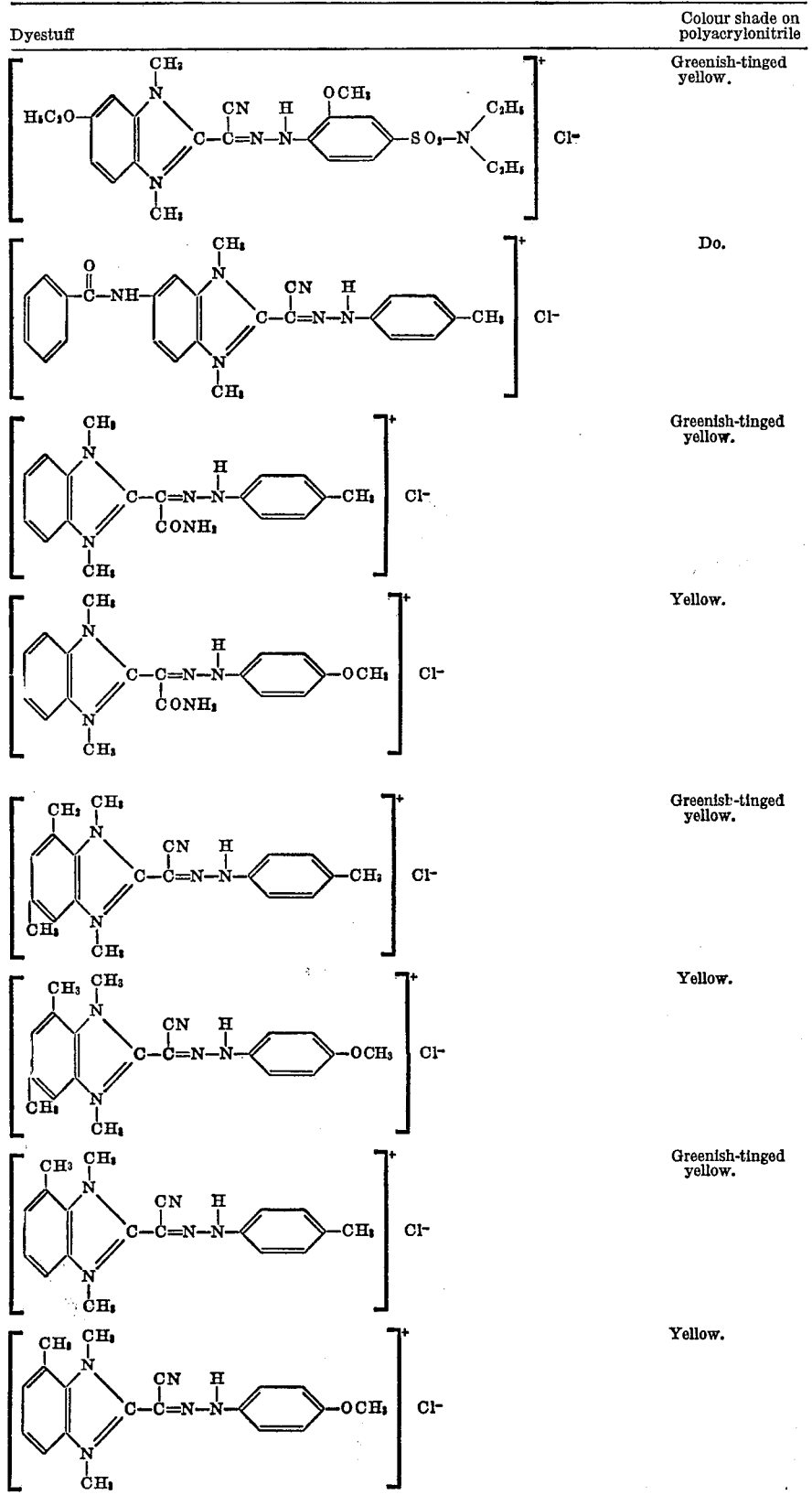 | Greenish-tinged yellow. |
| | Do. |
| | Greenish-tinged yellow. |
| | Yellow. |
| | Greenish-tinged yellow. |
| | Yellow. |
| | Greenish-tinged yellow. |
| | Yellow. |

EXAMPLE 2

39.7 parts of the moist coupling product manufactured according to the instruction for Example 1, are suspended in 800 parts by volume of water at room temperature and rendered alkaline to pH=11, with 10 parts by volume of 10% strength sodium carbonate solution. Thereafter the mixture is further stirred for 3 hours at 40° C. and about 20 hours at room temperature, and the product is filtered off and washed with water until neutral. After recrystallising the crude product from dimethylformamide, and drying, 18.3 parts of pure material of melting point 256–260° C. are obtained.

This substance is warmed to 50° C. in 100 parts by volume of toluene, 9.1 parts of dimethyl sulphate are added dropwise, and the mixture is heated for 2 hours on a waterbath. After further addition of 4.6 parts of dimethyl sulphate and heating for 3 hours, a crystalline compound separates out, of which 26.3 parts are obtained after drying. After dissolving in 1500 parts by volume of hot water, filtering, cooling the solution, and salting out with 70 parts of sodium chloride, 13.6 parts of the dry dyestuff of formula

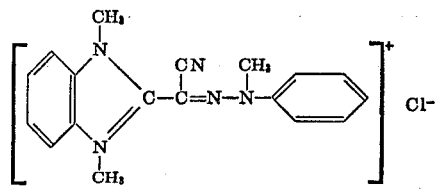

melting between 223 and 225° C. are obtained.

This dyestuff dyes polyacrylonitrile and the above-mentioned materials in a greenish-tinged yellow colour shade of good general level of fastness.

Further dyestuffs manufactured in accordance with this example are listed in the table which follows:

| Dyestuff | Colour shade on polyacrylonitrile |
| --- | --- |
| (benzimidazole-CN-C=N-N(CH₃)-C₆H₄-CH₃) Cl⁻ | Greenish-tinged yellow. |
| (benzimidazole-CN-C=N-N(CH₃)-C₆H₄-OCH₃) Cl⁻ | Do. |
| (benzimidazole-CN-C=N-N(CH₃)-C₆H₄-NH-CO-CH₃) Cl⁻ | Reddish-tinged yellow. |
| (benzimidazole-CN-C=N-N(CH₃)-C₆H₄-N=N-C₆H₅) Cl⁻ | Do. |
| (methyl-benzimidazole-CN-C=N-N(CH₃)-C₆H₄-CH₃) Cl⁻ | Greenish-tinged yellow. |
| (methyl-benzimidazole-CN-C=N-N(CH₃)-C₆H₄-OCH₃) Cl⁻ | Do. |
| (methyl-benzimidazole-CN-C=N-N(CH₃)-C₆H₄-NH-CO-CH₃) Cl⁻ | Reddish-tinged yellow. |

| Dyestuff | Colour shade on polyacrylonitrile |
|---|---|
| 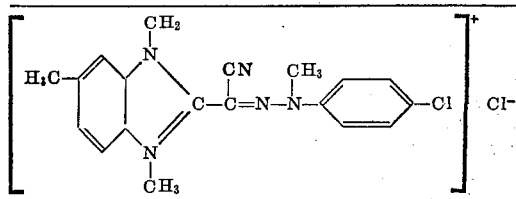 | Yellow. |
| 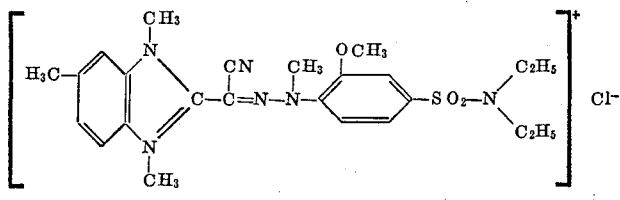 | Do. |
| 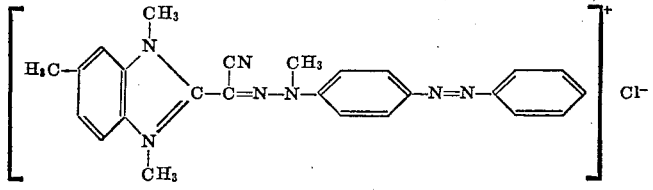 | Gold-yellow. |
| 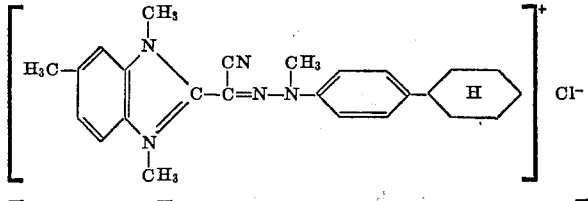 | Yellow. |
| 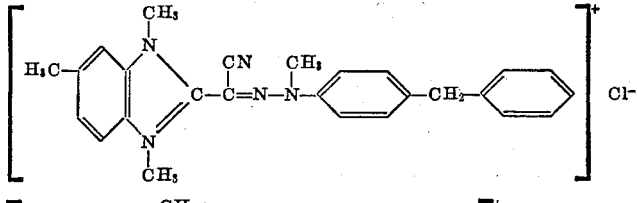 | Do. |
| 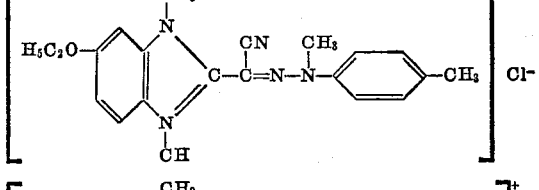 | Greenish-tinged yellow. |
| 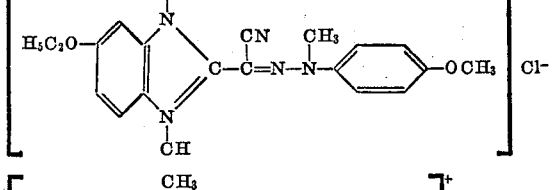 | Do. |
| 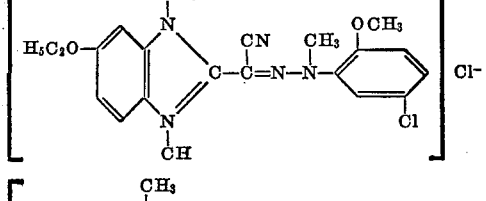 | Do. |
| 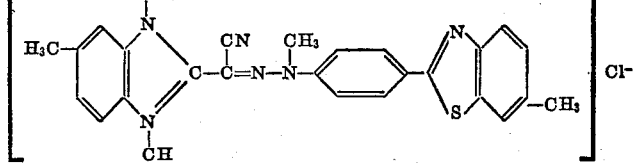 | Orange. |

EXAMPLE 3

Using a liquor ratio 1:40, polyacrylonitrile fibres are introduced at 40° C. into an aqueous bath which per litre contains 0.75 g. of 30% strength acetic acid, 0.38 g. of sodium acetate and 0.3 g. of the dyestuff of formula

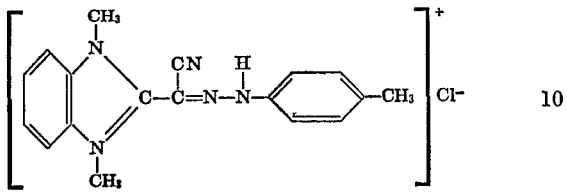

The bath is heated to the boil over the course of 20–30 minutes and kept at this temperature for 30–60 minutes. Thereafter the polyacrylonitrile fibres are rinsed and dried. They are dyed in a greenish-tinged yellow having very good fastness properties.

EXAMPLE 4

Using a liquor ratio of 1:40, acid-modified polyglycol terephthalate fibres are introduced into an aqueous bath at 20° C., which per litre contains 6–10 g. of sodium sulphate, 0.5–1 g. of oleyl-polyglycol-ether (50 mols of ethylene oxide), 0.15 g. of dimethyl-benzyl-dodecyl-ammonium chloride and 0.3 g. of the dyestuff

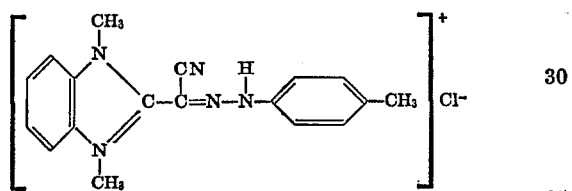

and which was adjusted to pH 4 to 5 with acetic acid. The bath is heated to 120° C. over the course of 30 minutes and kept at this temperature for 60 minutes. Thereafter the fibres are rinsed and dried. A greenish-tinged yellow dyeing having very good fastness properties is obtained.

EXAMPLE 5

A woven fabric of polyacrylonitrile is printed with a printing paste which was manufactured in the following manner: 330 parts by weight of hot water are poured over 30 parts by weight of the dyestuff of formula

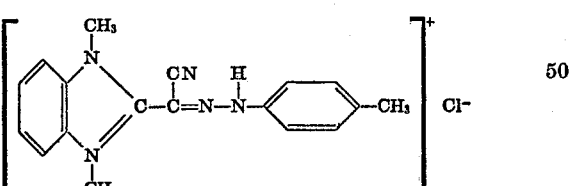

50 parts by weight of thiodiethylene glycol, 30 parts by weight of cyclohexanol and 30 parts by weight of 30% strength acetic acid, and the resulting solution is added to 500 parts by weight of crystal gum (gum arabic as thickener). Finally, 30 parts by weight of zinc nitrate solution are also added. The resulting print is dried, steamed for 30 minutes and subsequently rinsed. A greenish-tinged yellow print having very good fastness properties is obtained.

What is claimed is:
1. A basic dyestuff of the formula:

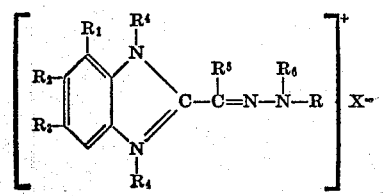

wherein
R is 5,6,7,8-tetrahydro-1-naphthyl, phenyl, or phenyl substituted by a member selected from the group consisting of chloro, alkyl of 1–4 carbon atoms, alkoxy of 1–4 carbon atoms, cyclohexyl, benzyl, phenoxy, benzyloxy, acetylamino, benzoylamino, N,N-diethylsulfonylamino, 6-methyl-benzthiazolyl-2, phenylazo, methylphenylazo, and methoxyphenylazo;
$R_1$ is hydrogen or alkyl of 1–4 carbon atoms;
$R_2$ is hydrogen, alkyl of 1–4 carbon atoms, alkoxy of 1–4 carbon atoms, acetyl, benzoyl, or ureido;
$R_3$ is hydrogen or alkyl of 1–4 carbon atoms;
$R_4$ is alkyl of 1–4 carbon atoms;
$R_5$ is nitrile, carbonamido, or N-methylcarbonamido;
$R_6$ is hydrogen or alkyl of 1–4 carbon atoms;
$X^-$ is an anion;
and wherein the radicals of R, $R_1$, $R_2$, $R_3$, $R_4$, $R_5$, or $R_6$ are further substituted by alkyl of 1–4 carbon atoms, alkoxy of 1–4 carbon atoms, benzyl, benzyloxy, phenyl, chlorophenyl, methylphenyl, phenoxy, chloro, bromo, carbonamido, alkylcarbonamido wherein the alkyl contains 1–4 carbon atoms, amino, acetoxy, acetylamino, methylsulphonylamino or acetyl.

2. A basic dyestuff of Claim 1 of the formula:

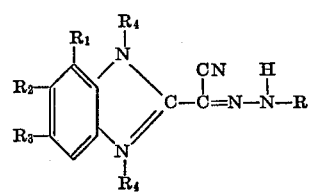

wherein
R is phenyl, or phenyl substituted by a member selected from the group consisting of chloro, alkyl of 1–4 carbon atoms, alkoxy of 1–4 carbon atoms, cyclohexyl, benzyl, phenoxy, benzyloxy, acetylamino, benzoylamino, N,N-diethylsulfonylamino, 6-methyl-benzthiazolyl-2, phenylazo, methylphenylazo, and methoxyphenylazo;
$R_2$ and $R_3$ are hydrogen, alkyl of 1–4 carbon atoms, or alkoxy of 1–4 carbon atoms;
$R_1$ and $R_4$ are the same as described in Claim 1; and
the further substitutions of R, $R_1$, $R_2$, $R_3$, and $R_4$ are the same as described in Claim 1.

3. A basic dyestuff of the formula:

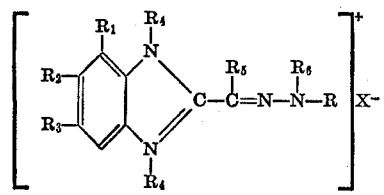

wherein
R is 5,6,7,8-tetrahydro-1-naphthyl, phenyl, or phenyl substituted by a member selected from the group consisting of chloro, alkyl of 1–4 carbon atoms, alkoxy of 1–4 carbon atoms, cyclohexyl, benzyl, phenoxy, benzyloxy, acetylamino, benzoylamino, N,N-diethylsulfonylamino, 6-methyl-benzthiazolyl-2, phenylazo, methylphenylazo, and methoxyphenylazo;
$R_1$ is hydrogen or alkyl of 1–4 carbon atoms;
$R_2$ is hydrogen, alkyl of 1–4 carbon atoms, alkoxy of 1–4 carbon atoms, acetyl, benzoyl, or ureido;
$R_3$ is hydrogen or alkyl or 1–4 carbon atoms;
$R_4$ is alkyl of 1–4 carbon atoms;
$R_5$ is nitrile, carbonamido, or N-methylcarbonamido;
$R_6$ is hydrogen or alkyl of 1–4 carbon atoms;
$X^-$ is an anion.

4. A basic dyestuff of the formula

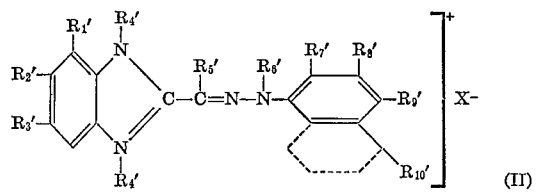

wherein
R₁' represents hydrogen or methyl;
R₂' represents hydrogen, methyl, methoxy, ethoxy, acetylamino, benzoylamino or ureido;
R₃' represents hydrogen or methyl;
R₄' represents methyl or ethyl;
R₅' represents nitrile, carbonamido or N-methylcarbonamido;
R₆' represents hydrogen, methyl, ethyl or n-butyl;
R₇' represents hydrogen, methyl, methoxy, ethoxy or phenoxy;
R₈' represents hydrogen, methyl, methoxy, ethoxy or benzyl;
R₉' represents hydrogen, chlorine, methyl, methoxy, ethoxy, phenoxy, acetylamino, benzoylamino, N,N-diethylsulphonylamino, cyclohexyl, benzyl, benzyloxy, phenylazo, phenylazo substituted by methyl or methoxy, or 6-methyl-benzthiazolyl-2-;
R₁₀' represents hydrogen, methyl, methoxy, chlorine, or tetramethylene to form 5,6,7,8-tetrahydronaphthyl; and
X⁻ represents an anion.

5. A dyestuff of the formula

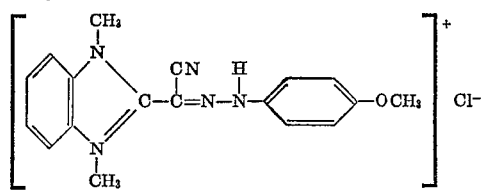

6. A dyestuff of the formula

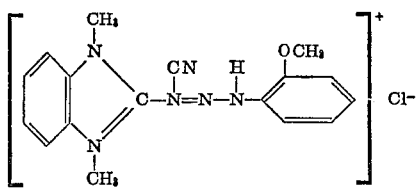

7. A dyestuff of the formula

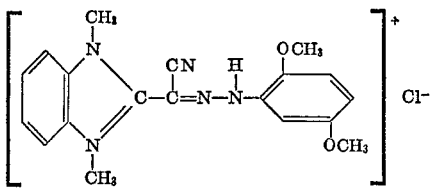

8. A dyestuff of the formula

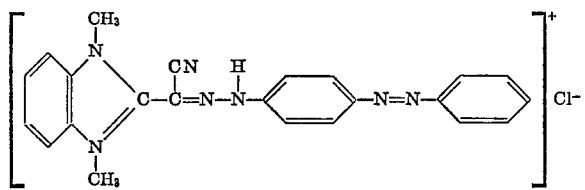

9. A dyestuff of the formula

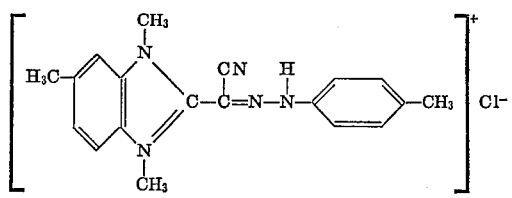

10. A dyestuff of the formula

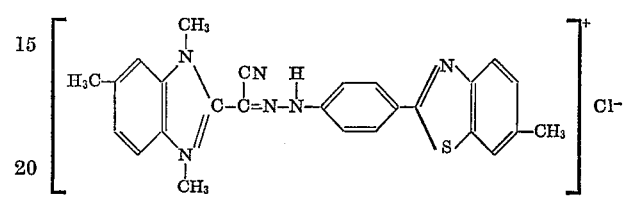

11. A dyestuff of the formula

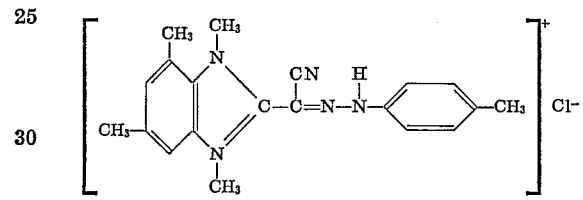

12. A dyestuff of the formula

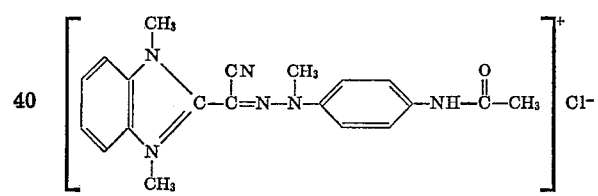

References Cited

UNITED STATES PATENTS

| | | | |
|---|---|---|---|
| 3,154,555 | 10/1964 | Dehnert | 260—294.8 |
| 3,158,608 | 11/1964 | Raue | 260—240 G |
| 3,331,831 | 7/1967 | Raue et al. | 260—162 |
| 3,345,355 | 10/1967 | Raue | 260—165 |
| 3,346,585 | 10/1967 | Dehner | 260—305 |
| 3,417,082 | 12/1968 | Taylor | 260—240 G |
| 3,320,279 | 5/1967 | Brack | 260—326.15 |

FOREIGN PATENTS

| | | | |
|---|---|---|---|
| 1,410,212 | 8/1965 | France | 260—157 |

OTHER REFERENCES

Slouka: Chemical Abstracts, vol. 70, pp. 347 and 414S (1969).

FLOYD D. HIGEL, Primary Examiner

U.S. Cl. X.R.

8—4, 41 A, 41 C; 260—145 R, 157, 158, 309.2